United States Patent Office 2,953,552
Patented Sept. 20, 1960

2,953,552

PRODUCTION OF ETHYLENE-α-BUTENE COPOLYMERS WITH A CATALYST OF ALUMINUM ALKYL, TITANIUM ESTER AND TITANIUM HALIDE

Guido B. Stampa, Plainfield, and Mark J. Stanek, Summit, N.J., assignors to Union Carbide Corporation, a corporation of New York No Drawing. Filed July 31, 1958, Ser. No. 752,178

5 Claims. (Cl. 260—88.2)

The present invention relates generally to the polymerization of ethylene. More particularly, the invention relates to the formation of ethylene-α-butene copolymers and to novel catalyst compositions for producing these copolymers using only ethylene as the raw material.

Copolymers of ethylene and α-butene have been formed by several methods in the past. Generally, however, prior proposed methods involve a two-stage operation in which α-butene is first prepared separately according to any suitable process, is purified, and then introduced through a metering device into a reactor in which ethylene is undergoing polymerization in the presence of a catalyst which normally produces high molecular weight polyethylene. The presence of the α-butene, however, causes the formation of an ethylene-α-butene copolymer in much the same way as any vinyl type monomer reacts with ethylene to form a copolymer. An example of this two-stage type of process is set forth in British Patent No. 578,584 in which the copolymerization of ethylene and butylene is carried out in an aqueous medium, under pressure, and using a peroxide catalyst.

The prior art two-stage processes have the disadvantage of requiring mechanical regulators to control the input of α-butene into the polymerization reactor in order to control, in turn, the α-butene content of the copolymer. Further, the separate preparation and purification of the α-butene is expensive and time consuming and involves difficult handling problems.

It is therefore the general object of the present invention to provide a process for forming copolymers of ethylene and α-butene which avoid the disadvantages of the prior known methods.

It is a particular object to provide a process in which α-butene may be produced and simultaneously reacted with ethylene to form an ethylene-α-butene copolymer and in the same reactor.

It is another object to provide a catalyst composition capable of producing the desired copolymer from a single raw material.

It is still another object to provide a means for controlling the composition of the copolymer without resorting to mechanical regulating devices.

These and other objects, which will become apparent from the disclosure and claims appearing hereinafter, are accomplished by contacting ethylene monomer in a suitable inert solvent therefor with a catalytic amount of a composition comprising an aluminum trialkyl, a titanium ester, and an inorganic titanium halide compound.

The use of titanium trichloride and titanium tetrachloride in combination with an aluminum trialkyl is well known as a catalyst composition for the polymerization of ethylene at low pressures. It is generally believed that the aluminum trialkyl is the "true catalyst" constituent which has the ability to form compounds such as

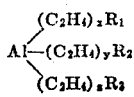

with ethylenically unsaturated monomers. The period of time during which the polymer chains are allowed to grow and thus increase in molecular weight is directed primarily by the titanium chloride compound which has been called an "activator" and which causes the polymer chains to split off from the aluminum and permit the growth process to again occur on the aluminum. Titanium trichloride and titanium tetrachloride have been found to be generally excellent as activators which permit the rapid production of relatively long polymeric chains.

Other activators, however, have quite different directing properties which influence such characteristics of the resulting polymers as the linearity, wax content, degree of unsaturation and the like.

Titanium esters as, for instance, $Ti(OC_4H_9)_4$ when employed as the only activators in combination with an aluminum trialkyl in the presence of ethylene do not produce long chain polymers, but instead result in the formation of the dimer, i.e., α-butene, as the almost sole reaction product. We have discovered that this reaction is not substantially altered by the presence of titanium trichloride or titanium tetrachloride, but rather is capable of producing α-butene in the same reaction system in which ethylene and the α-butene produced are being formed into long chain polymers. In addition the quantity of α-butene made available and the rate at which it is produced has been found to be directly proportional to the concentration of the titanium ester present in the initial catalyst charged into the polymerization reactor.

By utilizing two distinct catalytic effects of two different catalyst systems we have discovered it is possible to accomplish in a one-stage operation what heretofore required two stages to attain.

According to the present invention, copolymers of ethylene and α-butene may be produced solely from ethylene by contacting ethylene in a suitable inert solvent medium with the catalyst composition comprising a titanium ester, a titanium halide, and an aluminum trialkyl. Without desiring to be bound by any particular theory it is our belief that the titanium ester in combination with the aluminum alkyl causes the formation of α-butene in situ where it is immediately avalable to copolymerize with ethylene polymer chains being formed at the same time by the action of the titanium halide compound in conjunction with other aluminum trialkyl molecules.

As a general rule the reactions should be carried out under anhydrous conditions in the absence of oxygen, and in a suitable inert solvent medium. The solvent medium may consist of one, or a mixture of two or more, of those inert organic solvents conventionally used as media for ethylene polymerization. Inert aromatic and saturated aliphatic and alicyclic hydrocarbon liquids have been found to be most suitable, such as benzene, toluene, xylene, cyclohexane, methylcyclohexane, ethylcyclohexane, n-pentane, n-hexane, heptane, isooctane, and the like.

The components of the catalyst mixture may vary considerably due primarily to the large number of titanium esters which are known and which in the presence of a trialkyl aluminum direct the polymerization of ethylene to the almost exclusive production of α-butylene. Broadly stated any titanium organic ester will serve as the agent for forming the α-butene required in the present invention. Certain titanium esters are preferred, however. The preferred members include the lower alkyl esters of titanium having up to eight carbon atoms as for instance methyl, ethyl, n-propyl, isopropyl, butyl, isobutyl, tert-butyl, and amyl titanates, and the alicyclic and lower alkyl substituted alicyclic esters of titanium such as cyclohexyl and methyl cyclohexyl titanates. Particularly preferred are the lower alkyl esters having from about 2 to about 6 carbon atoms.

The titanium esters can be prepared by several procedures well known in the art. Specifically the method developed by Cullinane et al. and reported in "Journal Soc. Chem. Ind.," Supp. vol. 69, 538 (1950), has been found to be quite practical. The technique, illustrated by the preparation of n-butyl titanate, is described in Example I herein.

The titanium halide component of the catalyst composition includes titanium trichloride, titanium tetrachloride, titanium tribromide and titanium tetrabromide. Of these the trichloride and the tribromide are greatly preferred over the tetrabromide and the tetrachloride. The preference is due principally to the fact that the tetrachloride and tetrabromide allow much poorer control over the reaction, apparently because of exchange reactions with the titanium ester which occur during and after reduction with aluminum trialkyl.

The aluminum trialkyls of the present invention are represented as having the general formula:

where $R_1$, $R_2$ and $R_3$ are the same or different alkyl groups. The specific alkyl groups employed are by no means critical since in the presence of ethylene monomer in the reaction mixture, the original alkyl substitutents on the aluminum atom are split off as a part of the first polymer chain produced and are thereafter replaced by ethyl groups thereby forming triethyl aluminum. Practically, $R_1$, $R_2$ and $R_3$ are straight or branched chain alkyl groups having 2 to 8 carbon atoms and are preferred because of the disproportionate cost involved in using higher homologs, although those groups having a larger number of carbon atoms may be employed successfully.

In the utilization of the individual catalyst components, i.e., the trialkyl aluminum, titanium halide and titanium ester, as a composition for producing ethylene-α-butene copolymers the concentration of the constituents of this catalyst mixture in the solvent is not narrowly critical. Generally, concentrations of about 1 to about 10 millimoles titanium halide, about 5 to about 60 millimoles aluminum trialkyl and about 1 to about 15 millimoles titanium ester per liter of reaction solvent medium have been found to be very effective.

Since the production rate of α-butene relative to the production of polymer chains composed of ethylene units and whatever α-butene units are available is dependent upon the relative concentration of titanium halide and titanium ester, the concentration ratio of these two catalyst constituents is much more important than the ratio of either to aluminum trialkyl. Basically, the aluminum trialkyl performs the function of forming polymer chains of whatever ethylenically unsaturated monomers are available. During their formation these chains are attached to the aluminum atom. The titantium ester and the titanium halide function as agents which "splitoff" the growing chains from the aluminum atom. The titanium ester splits off chains comprising two ethylene units which result in α-butene formation. The amount of α-butene available for copolymer formation with ethylene under the influence of the titanium halide-aluminum trialkyl combination is therefore directly proportional to the ratio of the concentrations of the titanium ester and the titanium halide in the reaction mixture. The aluminum trialkyl is preferably present in excess. Thus for a solution containing 5 to 10 millimoles titanium halide and 50 millimoles aluminum alkyl per liter of reaction solvent medium, copolymers containing one percent to about 35 percent butene can be obtained by varying the concentration of titanium ester from 2.5 to 12.5 millimoles per liter of reaction solvent medium.

The following table shows the relationship between the α-butene content of the copolymer and varying catalyst component ratios.

TABLE I

| Exp. No. | Conc. $TiCl_3$, M. Moles/L. | Conc. $Ti(OR)_4$, M. Moles/L. | Conc. $Bu_3Al$, M. Moles/L. | Time, Min. | Yield, Grams | Percent Butene in Copolymer |
|---|---|---|---|---|---|---|
| a | 10 | 2.5 | 50 | 180 | 190 | 1.2 |
| b | 10 | 7.5 | 50 | 180 | 176 | 7.9 |
| c | 10 | 12.5 | 50 | 180 | 133 | 17.9 |
| d | 7.5 | 12.5 | 50 | 180 | 117 | 22.8 |
| e | 5 | 12.5 | 50 | 180 | 61 | 31.2 |

Thus, it is seen from the table above that the percent of α-butene in the final copolymer product can be controlled either by maintaining a fixed ratio of the concentration of aluminum trialkyl to the titanium halide while varying the titanium ester concentration, or by varying the titanium halide concentration while maintaining a fixed concentration ratio of trialkyl aluminum to titanium ester.

The conditions under which the copolymerization reaction is carried out are not narrowly critical. As a rule high pressure conditions tend to promote the formation of ethylene homopolymer at the expense of the desired copolymer. For this reason it is preferred to carry out the copolymerization at normal atmospheric pressure. Pressures up to about 10 p.s.i. above atmospheric pressure are not harmful, however, and in fact serve to increase somewhat the concentration of monomeric ethylene in the solvent reaction medium.

The optimum temperature for the reaction has been found to be in the range of from about 60° C. to 65° C. This range represents a balance between lower temperatures which result in slow rates of polymerization, and higher temperatures which result in decreased solubility of the α-butene in the reaction diluent. A range of temperatures from about 25° C. to about 100° C. is, however, suitable.

The reactor may be any suitable vessel equipped with means for maintaining a chosen temperature, means for excluding atmospheric contaminants, means for stirring or otherwise agitating the reaction mixture, and means for feeding in the ethylene, catalyst material and solvent medium.

The general embodiment of the process comprises the steps of charging the reaction diluent (solvent medium) and the premixed catalyst composition, usually dissolved or dispersed in a small portion of the same solvent as that used as the reaction diluent, into the reactor, and feeding in the ethylene in the gaseous state with continuous stirring of the reaction mixture. Preferably the ethylene is added at approximate take-up rate and the reaction continued until the contents of the reactor become too viscous for practical stirring. The reaction mass is poured into a catalyst quenching alcohol and the copolymer removed by filtration and washed. It is to be understood that the process may be carried out on a continuous basis, a single charge batch basis or with any other arrangement of the steps comprising the present invention without departing from the intended scope.

In many respects the copolymers resulting from the process hereinbefore described resemble the hydrogenated polybutadiene materials which come within the general term Hydropols (cf. Ind. Eng. Chem. 45, 117–1122 (1953)). In general terms, polybutadiene having the structure

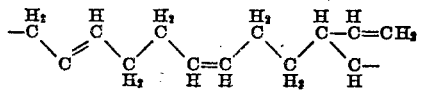

are catalytically hydrogenated to form the corresponding saturated Hydropol viz.

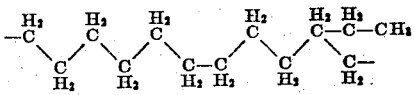

The copolymers produced according to the present invention have the general formula

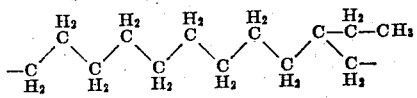

The properties of the copolymers vary somewhat with the butene content, i.e., those having less than 15 percent α-butene content tend to resemble polyethylene, those with an α-butene content of about 15 to about 25 percent resemble Hydropol, and those having an α-butene content of about 30 percent tend to be rubbery and elastic. The most useful copolymers are found to range in α-butene content from about 2 to about 25 percent. Copolymers in this latter category have densities ranging from about 0.946 to about 0.898, respectively, and molecular weights characterized by melt indices [10P—(ASTM procedure D–1238–52T modified by increasing the pressure exerting weight ten fold)] of from about 0.1 to about 0.3.

The copolymers possess especially good electrical and low temperature properties and are therefore particularly useful as insulation sheaths for electrical conductors.

was maintained at about 60° C. to 65° C. The reaction mixture was then quenched with alcohol, and the solid copolymer was removed by filtration and dried. The yield was 133 grams. Analysis showed the α-butene content to be 17.9 percent, the density at 25° C. to be about .908 and the melt index (10P) to be 0.144.

*Example III*

Two liters of dry cyclohexane, 10 millimoles of $TiCl_3$, 12.5 millimoles of methyl cyclohexyl titanate and 50 millimoles of triisobutyl aluminum were charged to a 3-liter reactor vessel equipped with a stirrer, reflux condenser, and an ethylene inlet. Ethylene was then passed into the solution in the reactor at atmospheric pressure at a rate slightly in excess of uptake for a period of three hours. The reactor temperature was maintained at 60 to 65° C. The reaction mixture was then quenched with alcohol, and the solid polymer was removed by filtration and diced. The yield was 145 grams. The butene content of the copolymer was 15.7 percent.

*Example IV*

Four copolymerization reactions were performed according to the method of Example II with the exception that the amounts of titanium ester and titanium halide were varied in each reaction. The catalyst proportions used and the properties of the copolymers produced are as shown below.

| Reaction No. | Conc. $TiCl_3$, M. Moles/L. | Conc. $Ti(OR)_4$, M. Moles/L. | Conc. $Bu_3Al$, M. Moles/L. | Time, Min. | Yield, Grams | Percent Butene | 10 P Melt Index | Density at 25° C. |
|---|---|---|---|---|---|---|---|---|
| 1 | 10 | 2.5 | 50 | 180 | 190 | 1.2 | 0.105 | 0.946 |
| 2 | 10 | 7.5 | 50 | 180 | 176 | 7.9 | 0.300 | 0.951 |
| 3 | 7.5 | 12.5 | 50 | 180 | 117 | 22.8 | 0.102 | 0.898 |
| 4 | 5 | 12.5 | 50 | 180 | 81 | 31.2 | | |

The following examples will more particularly illustrate the novel process of this invention, and describe methods of producing those constituents of the reaction mixture which may not be readily available commercially. It is to be understood that the examples are for the purpose of illustration only and are not intended to define or limit the scope of the invention.

*Example I* n-Butyl titanate, typical of the titanium esters comprising one component of the catalyst compositions suitable for carrying out the hereinbefore described process was prepared in the following manner. One mole titanium chloride was slowly added, in the absence of moisture and with mechanical stirring, to seven moles of n-butyl alcohol over a period of about 30 minutes. The temperature was not allowed to rise above 30° C. The liquid was then cooled to 5° C. and allowed to stand for about 1 hour at this temperature. Dry ammonia was then bubbled into the liquid while the temperature was maintained at below 10° C. until all the chloride was precipitated as ammonium chloride. The precipitate was then filtered out, washed with dry benzene, and the washings added to the original filtrate. The n-butyl titanate was then separated from the benzene by vacuum distillation. The product had a boiling point of 189° C. at 13 mm. Hg.

*Example II*

A typical copolymerization reaction was carried out according to the following procedure. Two liters of dry cyclohexane, 10 millimoles of $TiCl_3$, 12.5 millimoles of tetrabutyl titanate, and 50 millimoles of triisobutyl aluminum were charged to a 3 liter reactor vessel equipped with a stirrer, reflux condenser, and an ethylene inlet. Ethylene was then passed into the solution in the reactor at atmospheric pressure at a rate slightly in excess of uptake for a period of 3 hours. The reactor temperature

What is claimed is:

1. A process for the production of ethylene-butene-1 copolymers which comprises contacting ethylene in an inert hydrocarbon solvent therefor with a catalytic amount amount of a catalyst composition consisting essentially of an aluminum trialkyl, a titanium ester having the general formula $Ti(OR)_4$ where R is a member selected from the group consisting of alkyl groups having from 2 to 8 carbon atoms and alicyclic groups containing from 4 to 8 carbon atoms, and a titanium halide selected from the group consisting of titanium trichloride, titanium tetrachloride, titanium tribromide, and titanium tetrabromide, the molar ratio of said aluminum trialkyl to said titanium ester being in the range of from about 60:1 to about 1:3, and the molar ratio of said titanium ester to said titanium halide being in the range of from about 15:1 to about 1:10.

2. A process according to claim 1 in which the molar ratio of aluminum trialkyl to titanium ester is at least 4:1 and the molar ratio of titanium ester to titanium halide is in the range of from about 2.5:1 to about 1:4.

3. A process according to claim 2 in which the concentration of aluminum trialkyl in the reaction mixture is about 5 to about 60 millimoles per liter of the inert hydrocarbon solvent reaction medium.

4. A process for producing ethylene-butene-1 copolymers from monomeric ethylene which comprises contacting said monomeric ethylene dissolved in an inert hydrocarbon solvent therefor with a catalyst composition consisting essentially of triisobutyl aluminum in an amount of about 50 millimoles per liter of said inert hydrocarbon solvent, titanium tetrachloride in an amount of about 10 millimoles per liter of said inert hydrocarbon solvent, and tetrabutyl titanate in an amount ranging from 2.5 to 12.5 millimoles per liter of said inert hydrocarbon solvent, the reaction mixture during the polymerization being maintained at about 55° C. to about 65° C.

5. A process for the production of copolymers of ethylene and butene-1 which comprises contacting ethylene in an inert solvent therefor with a catalytic amount of a catalyst composition consisting essentially of an aluminum trialkyl, a titanium ester having the general formula $Ti(OR)_4$ wherein R is a monovalent saturated hydrocarbon group, and a titanium halide selected from the group consisting of titanium trichloride, titanium tetrachloride, titanium tribromide, and titanium tetrabromide, the molar ratio of said aluminum trialkyl to said titanium ester being in the range of from about 60:1 to about 1:3, and the molar ratio of said titanium ester to said titanium halide being in the range of from about 15:1 to about 1:10.

References Cited in the file of this patent

UNITED STATES PATENTS

| | | |
|---|---|---|
| 2,833,755 | Coover | May 6, 1958 |
| 2,846,427 | Findlay | Aug. 5, 1958 |